A. J. NOBLETT.
COTTON CHOPPER.
APPLICATION FILED APR. 1, 1913.
1,095,224.
Patented May 5, 1914.
2 SHEETS—SHEET 2.
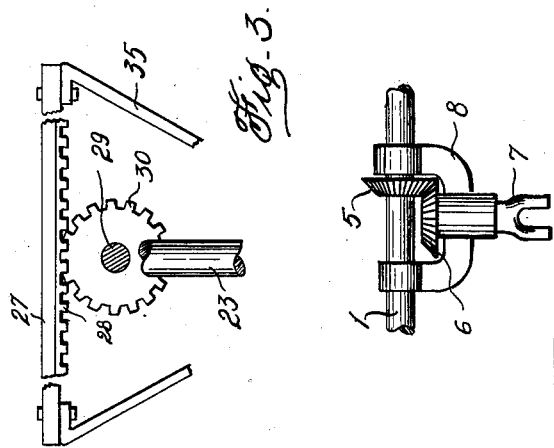
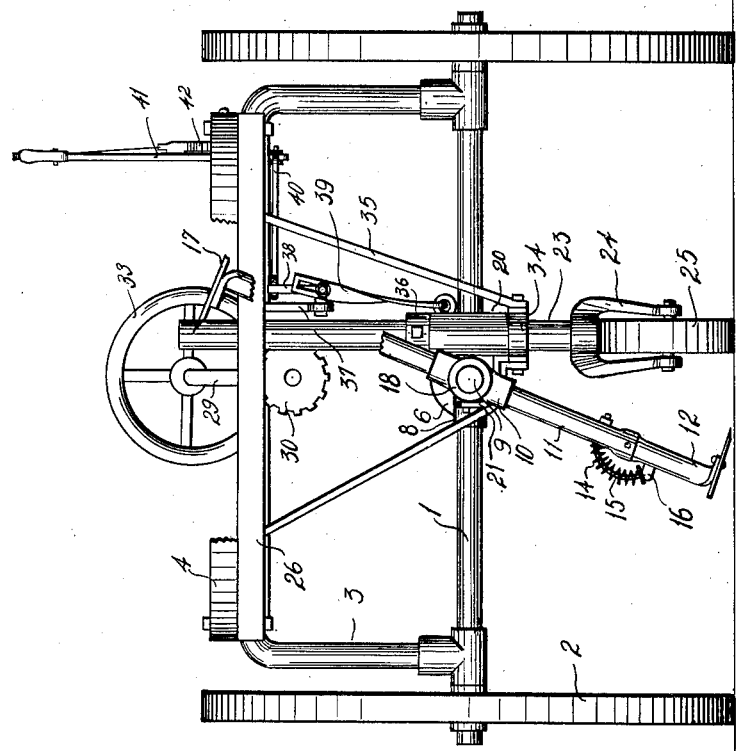
WITNESSES:
JC Ledbetter
D B Carr
INVENTOR
Adoniram J. Noblett
BY
John M Spellman
ATTORNEYS

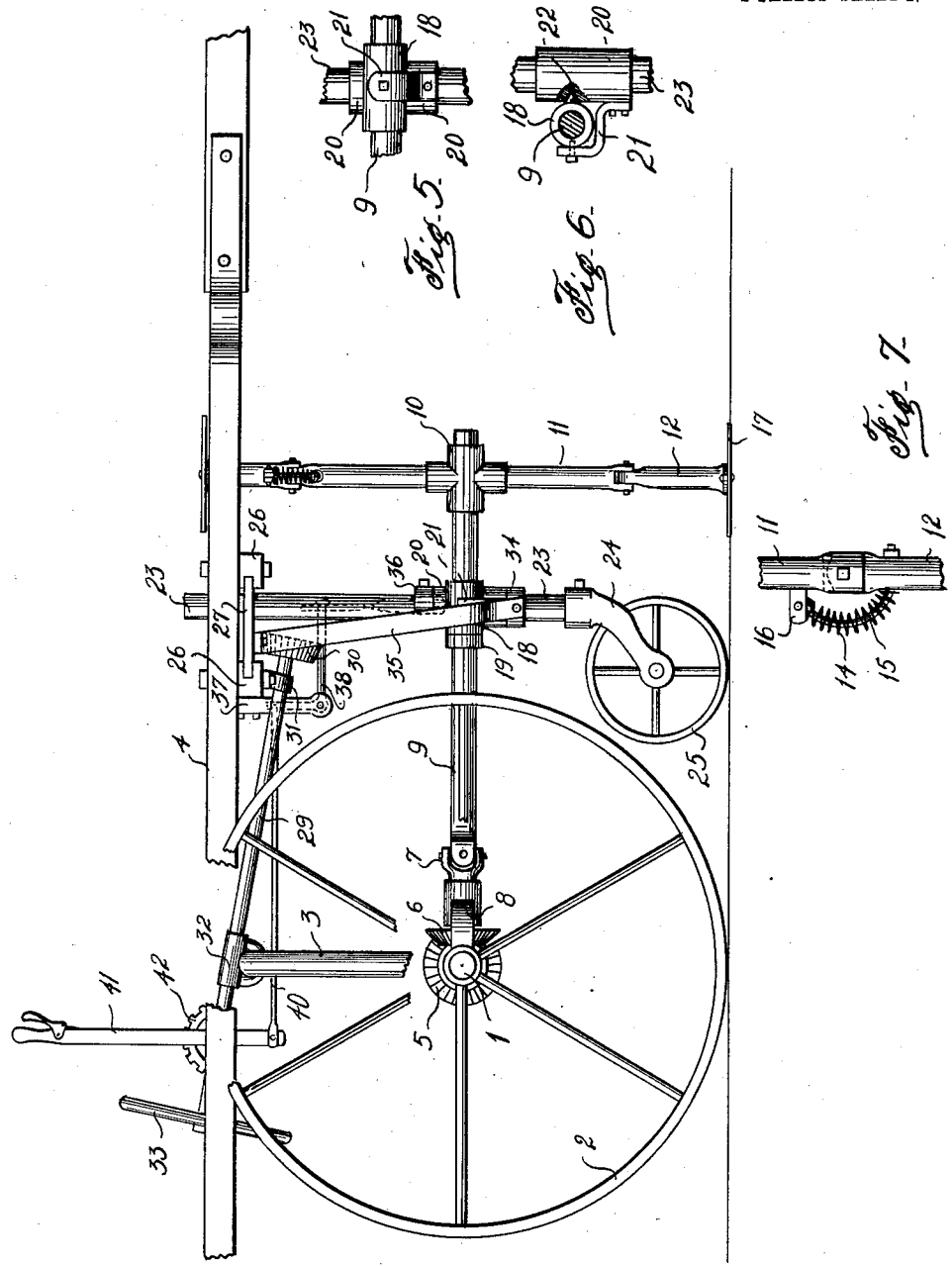

UNITED STATES PATENT OFFICE.

ADONIRAM J. NOBLETT, OF WACO, TEXAS.

COTTON-CHOPPER.

1,095,224.  Specification of Letters Patent.  Patented May 5, 1914.

Application filed April 1, 1913. Serial No. 758,137.

*To all whom it may concern:*

Be it known that I, ADONIRAM J. NOBLETT, a citizen of the United States, residing at Waco, in the county of McLennan and State of Texas, have invented certain new and useful Improvements in Cotton-Choppers, of which the following is a specification.

This invention as specified relates to new and useful improvements in cotton choppers.

The object of this invention is to provide a cotton chopper of the revolving hoe type in which provision is made for laterally adjusting the hoe shaft by a steering means whereby the hoes may be caused to follow the contour of the row and the chopping always performed in the row and not at one side thereof.

Another feature is to provide breakable shanks for the hoes arranged to yield to obstructions through which the hoes could not pass without injury, the hoes being returned to normal position after striking such obstructions.

A still further object of the invention is to provide a device of the character described that will be strong, durable, efficient and simple and comparatively inexpensive to construct, also one in which the several parts will not be likely to get out of working order.

With the above and other objects in view the invention has relation to certain novel features of construction and operation, an example of which is described in the following specification and illustrated in the accompanying drawings, wherein:

Figure 1 is a side elevation of a cultivator with the chopper mounted thereon, Fig. 2 is a front elevation of the same, Fig. 3 is a detail of the rack and gear, Fig. 4 is a detail of the transmission, Fig. 5 is a detail of the shaft and colter sleeves, Fig. 6 is another detail of the same parts at right angles to Fig. 5, and Fig. 7 is a detail of one of the breakable shafts.

In the drawings the numeral 1 designates the axle of a cultivator fixed in ground wheels 2. An arch member 3 is mounted on the axle and carries side bars 4, the member 3 and bars 4 being secured together in fixed relation in any suitable way. Certain parts of the cultivator have been omitted from the drawing as they do not bear on the invention.

A miter gear 5 is fixed on the center of the axle 1 and meshes with a miter gear 6 fixed on the end of a universal coupling 7. The gear 6 is supported in a bearing yoke 8 which straddles the gear 5 and has the free ends embracing the axle. A hoe shaft 9 extends forward from the coupling 7 and carries at its forward extremity a hub 10 from which hoe shanks radiate. These shanks comprise two members 11 and 12 pivoted together and normally alined by a coiled spring 14 confined on a rod 15 curved in an arc having its center coincident with the center of the pivot between the two members. The rod of each shank has one end fixed in a lug 16 projecting from the member 11 and its other end passing freely between the member 12, the spring bearing on the lug and the member 12. Hoes 17 are carried on the outer ends of the members 12 in proper position to chop transversely of the row when the shaft 9 is rotated. Should a hoe strike a rock, root or other hard obstruction the member 12 would yield and swing as the tension of the spring is only sufficient to resist such impact as would not injure the hoe. After the hoe has passed over the obstruction the spring will return it to normal position.

On the hoe shaft adjacent the hub 10, a sleeve 18 is loosely mounted, being free to slide forward but held against rearward movement by a collar 19 fastened on the shaft. At the side of the sleeve 18 a second sleeve 20 is disposed vertically. The sleeves are pivoted together by a bracket 21 secured to the sleeve 20 and pivotally supporting the sleeve 18; while the sleeve 18 has a bearing boss 22 engaging in a bearing in the sleeve 20 as shown in Fig. 6. A colter shaft 23 passes vertically through the sleeve 20 and has a colter bracket 24 loosely confined on its lower end, a flat faced guide wheel 25 is mounted in the bracket and is thus arranged to follow the shaft 23.

On the underside of the side bars 4 a pair of opposed channel members 26 are secured transversely of the cultivator and over the sleeve. A shifting plate 27 is mounted to slide transversely of the cultivator in the channels of the members 26. The colter shaft 23 passes freely through an aperture in the plate and in rear thereof, a gear rack 28 depends from the plate longitudinally thereof. A steering shaft 29 carries a bevel gear 30 on its forward end, said gear meshing with the rack. This shaft 29 is supported in bearings 31 and 32, the former secured to one of the members 26 and the latter mounted on the member 3. On the rear end of the shaft 29, a hand wheel is fixed. By revolving this wheel the shaft 29 and gear 30 are revolved whereby the plate 27 is shifted transversely of the machine through the agency of the rack 28. When the plate is shifted the shaft 23 is likewise shifted transversely of the machine, the wheel 25 following. It is apparent that the operator by merely turning the hand wheel may shift the colter shaft and thus swing the hoe shaft 9 and its hoes laterally, thereby following the contour of the row and always chopping in the row, the wheel 25 acting as a guide and a support.

In order to hold the shaft 23 in proper vertical position, a collar 34 is placed on the same and supports the sleeve 20, the shaft 23 passing loosely through the sleeve. This collar is carried by the lower ends of brace members 35 having their upper ends secured to the under side of the plate 27 as is best shown in Fig. 3, a rigid brace thus being formed for the shaft 23. The shaft 23 is free to be moved vertically and has adjustably secured thereon a collar 36 which bears on the upper end of the sleeve 20 and limits the downward displacement of the shaft 23.

A bracket 37 depends from the rear channel member 26 and supports a bell-crank lever 38. The forward extremity of the lever is loosely confined in the upper slotted end of a link 39 as is best shown in Fig. 2. The link has its lower end pivoted to the sleeve 20. A rod 40 extends from the upper end of the bell-crank lever to the lower end of an elevating lever 41 pivoted on one of the side bars 4 and engaging with the usual quadrant mechanism 42 whereby it may be fastened in adjusted positions. By swinging the lever 41 the bell-crank lever 28 is swung and the hoe shaft 9 and colter shaft 23 either raised or lowered according to the direction in which the lever 41 is swung.

It is apparent that the chopping depth may be controlled and the hoes maintained over the row irrespective of its irregular contour.

What I claim is:

1. In a cotton chopper, the combination with a frame, and a revolving axle supported in ground wheels, of a hoe shaft, a driving gearing connection with the axle, a universal coupling between the gearing and the shaft, hoes radially supported at the free end of the shaft, and a slidable member carried by the frame and having connection with the hoe shaft, a vertical shaft passing through the member and associated with the hoe shaft, a follower guide wheel mounted on the vertical shaft below the hoe shaft, and means for shifting the slidable member transversely of the frame.

2. In a cotton chopper, the combination with a frame, and a revolving axle supported in ground wheels, of a hoe shaft, a driving gearing connected with the axle, a universal coupling between the gearing and the shaft, hoes radially supported at the free end of the shaft, a vertical shaft, sleeves on both shafts pivoted together, a shifting plate slidably mounted on the frame, a connection between the plate and the vertical shaft at a point adjacent the sleeves, a steering device connected with the plate and a follower wheel mounted on the lower end of the vertical shaft.

3. In a cotton chopper, the combination of a wheel supported frame, a driving mechanism mounted on the frame, a central longitudinal hoe shaft, a universal connection between the shaft and the driving mechanism, a plurality of hoes fixed on the forward extremity of the shaft, a wheeled support connected to the shaft adjacent the hoes, means for adjusting the hoe shaft and the wheeled support vertically with relation to the frame, and means for adjusting the hoe shaft and wheeled support laterally with relation to the frame.

In testimony whereof I have signed my name to this specification in the presence of two subscribing witnesses.

ADONIRAM J. NOBLETT.

Witnesses:
E. B. DANIEL,
I. W. CRALOLL.

---

Copies of this patent may be obtained for five cents each, by addressing the "Commissioner of Patents, Washington, D. C."